United States Patent [19]

Boyles et al.

[11] Patent Number: 5,156,373
[45] Date of Patent: Oct. 20, 1992

[54] METHOD AND APPARATUS FOR REMOTELY CONTROLLING A ROTARY VALVE OR THE LIKE

[75] Inventors: Jackie R. Boyles, Sugarland, Tex.; Joseph L. Porter, New Iberia, La.; Albert P. Richter, Jr., Houston, Tex.

[73] Assignee: Texaco Inc., White Plains, N.Y.

[21] Appl. No.: 740,748

[22] Filed: Aug. 6, 1991

[51] Int. Cl.⁵ .............................................. F16K 31/05
[52] U.S. Cl. ................................ 251/129.12; 137/554; 251/129.04
[58] Field of Search ...................... 251/129.12, 129.11, 251/205, 129.04; 137/554

[56] References Cited

U.S. PATENT DOCUMENTS

| | | | |
|---|---|---|---|
| 4,407,326 | 10/1983 | Wilhelm | 251/129.12 X |
| 4,759,386 | 7/1988 | Grouw | 251/129.12 X |
| 4,798,227 | 1/1989 | Goodwin | 137/554 |
| 4,840,350 | 6/1989 | Cook | 251/129.12 X |
| 4,926,903 | 5/1990 | Kawai | 137/554 |

Primary Examiner—Arnold Rosenthal
Attorney, Agent, or Firm—Jack H. Park; Kenneth R. Priem; Russell J. Egan

[57] ABSTRACT

A rotary actuated valve choke or the like is remotely controlled by motor means fixedly mounted with respect to said valve to rotationally drive a stem thereof. Means are included to measure the rotation of said stem. Means are provided to measure valve output and appropriately control the energization of the motor in response thereto.

1 Claim, 2 Drawing Sheets

METHOD AND APPARATUS FOR REMOTELY CONTROLLING A ROTARY VALVE OR THE LIKE

BACKGROUND OF THE INVENTION

1. The Field of the Invention

The present invention relates to a method and apparatus for controlling a rotary actuated valve or the like from a remote location and in particular to a method and apparatus which controls the rotary actuated device permitting it to be set and reset with precision.

2. The Prior Art

The present invention finds use in the field of petroleum production and in particular to the servicing of gas wells located at offshore platforms. Offshore gas recovery platforms have a number of unique requirements including the ability to be rapidly shut down should the platform be threatened by an approaching weather system. Heretofore, it would have been necessary for production workers to attend to closing each of the valves on each of the production platforms. This would entail a substantial interruption in production considering the fact that the production rigs are often spaced a good distance apart and that there may be a number of valves which have to be closed with the approaching storm. A similar delay would be encountered in resetting the valves when the storm is no longer a threat. In gas recovery there are also production quotas which require the appropriate periodic resetting of the valves. Normally this would require the intervention of production personnel at each of the production platforms adjusting and resetting each of the valves manually.

There are known systems for controlling valves, but these systems are primarily of the linear type where the valve or choke is controlled by a reciprocal ram, generally acting against a spring bias tending to drive the valve or choke to a closed position. The known valve actuators of this type generally employ air or hydraulic cylinders which act against spring bias means to hold the valve or choke at the desired setting. The primary difficulty with this type of device is, should there be a failure of the hydraulic or air pressure, then the entire system will experience a shutdown. The failure of system pressure for even the briefest interval as well as failure by a drop in pressure below system tolerances can result in the unintentional and undesirable shutdown of the system. Another disadvantage of the fluid actuated systems is that they require pressurization at all times thereby necessitating that there must be a source of pressurization for the fluid.

The present invention overcomes many of the difficulties experienced with the prior art devices by providing a system which allows control of rotary actuated valves, chokes or similar control devices from a remote location and with great precision in the setting of the valve, choke or control device. A particular advantage of the present invention is that it can be added to existing production equipment without undue capital expense thereby significantly updating automation of a functioning production facility with minimal interruption of operation of the facility.

SUMMARY OF THE INVENTION

The present invention is intended for use with a conventional rotary actuated valve, choke, or like control device and comprises a frame secured to the valve and supporting a gear motor coupled to a shaft of the valve by a sliding coupling and transducer means. The latter is used to determine the relative position or setting of the valve. The motor is used to drive the valve to the new setting.

BRIEF DESCRIPTION OF THE DRAWINGS

The present invention will now be described by way of example with reference to the accompanying drawings in which.

DETAILED DESCRIPTION OF THE PREFERRED EMBODIMENT

Figure 1:
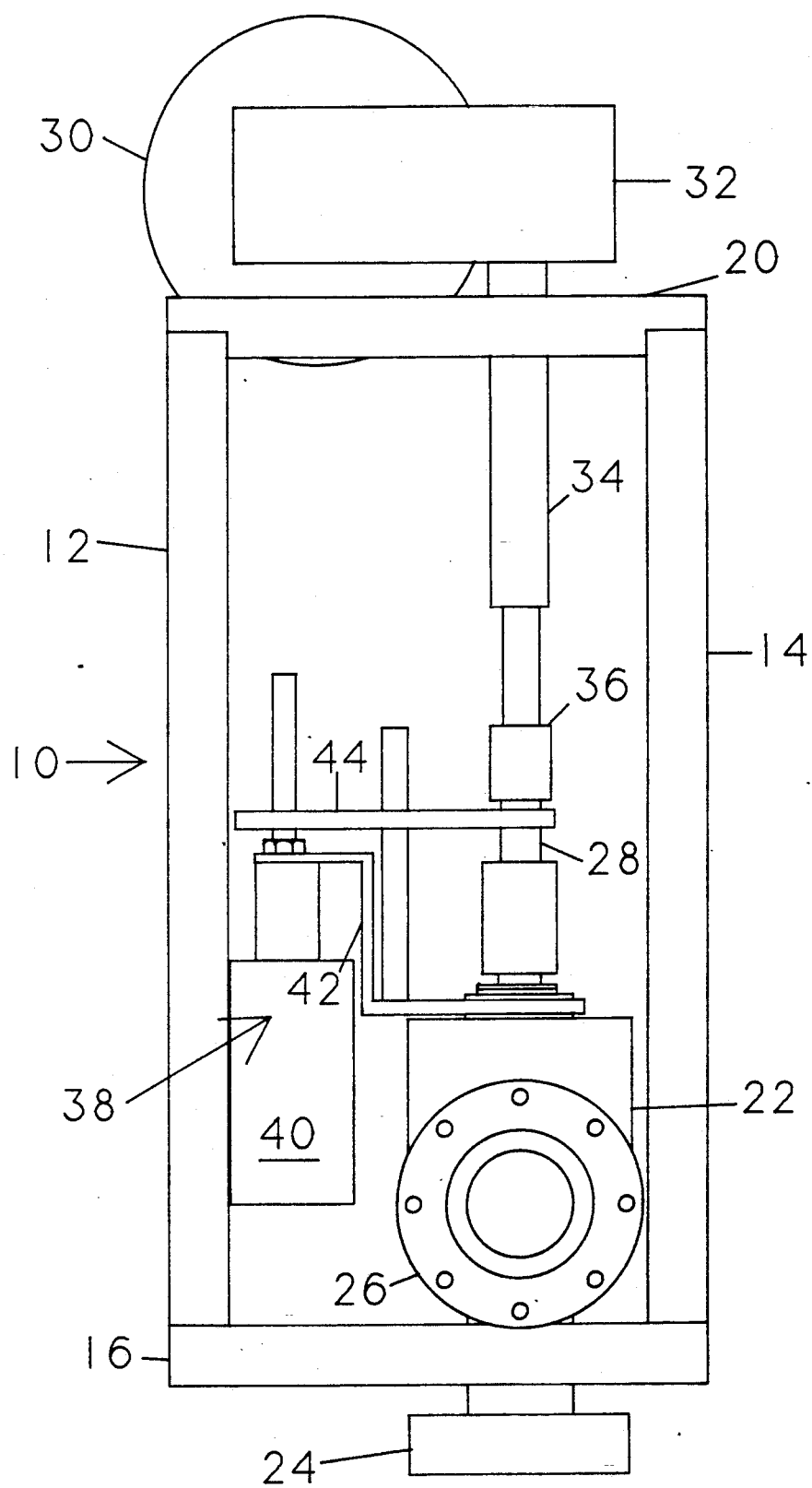
FIG. 1 is a front elevation of the present invention mounted on a known gas well choke or rotary valve.
Figure 2:
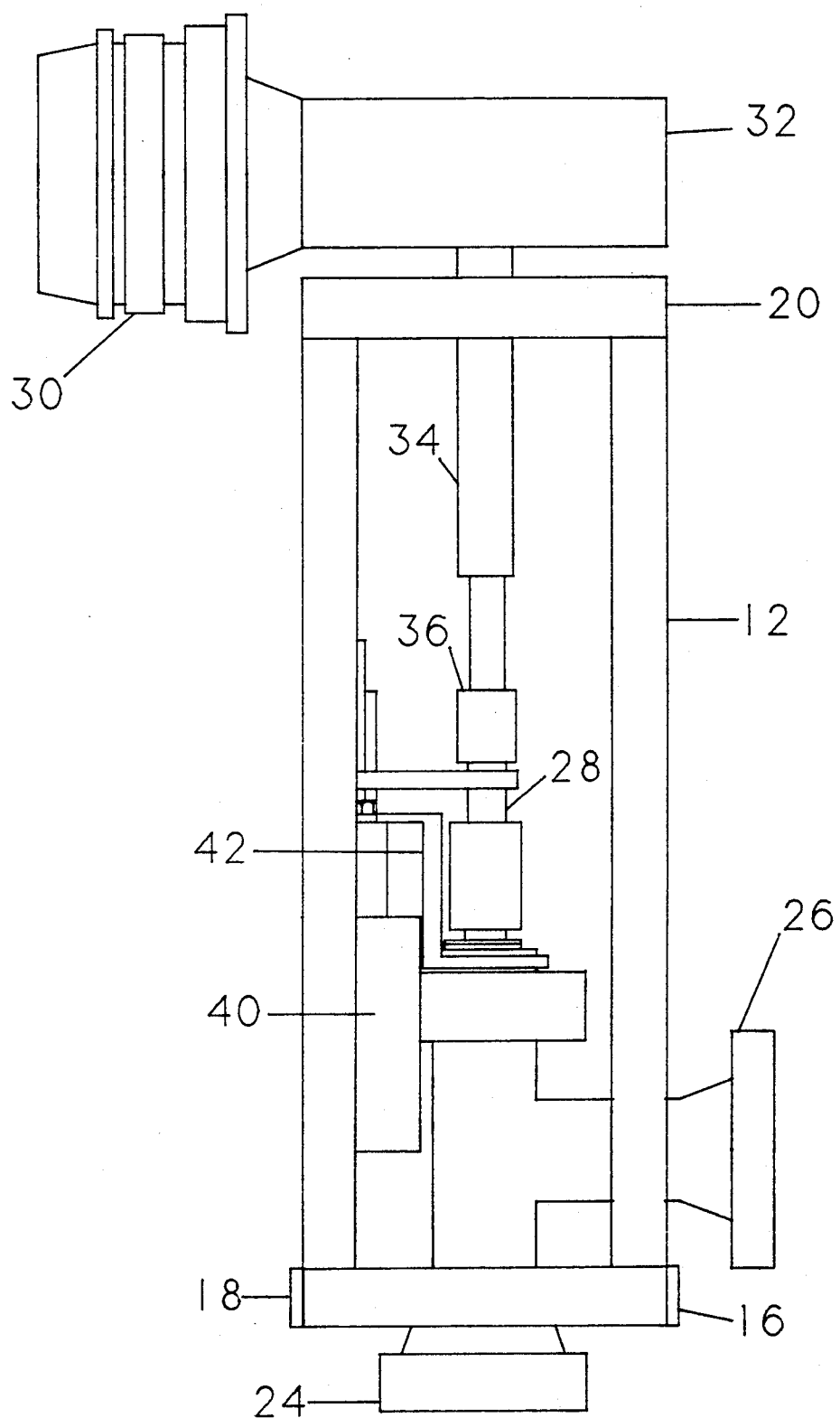
FIG. 2 is a side elevation of the subject invention.

The present invention has a frame 10 formed by mirror image plates 12,14 fixed in spaced relationship at one end by plates 16,18 and at the opposite end by a mounting plate 20. The frame 10 includes means (not shown) to mount it on a valve 22 which is a standard production valve of known configuration and which is attached at one end 24 to a production well (not shown) and at the other end 26 to a production pipe (not shown) with the valve having therein a known throttling member (also not shown) driven by a rotary valve stem 28. The present invention has a motor 30 connected to a gear reduction train 32, both of which are mounted on the plate 20. The gear reduction train 32 is connected to drive a gear reducer adapter 34 and sliding shaft coupling 36, one end the latter of which engages the stem 28 of the valve 22.

The present invention further includes a transducer assembly 38 to measure the rotation of the valve stem 28. The transducer assembly 38 includes a transducer unit 40, a frame 42 mounting the transducer unit 40 onto the valve 22 and means 44 attached to the transducer 40 and responsive to rotary movement of the valve stem 28 so that the position o opening of the internal throttling member of the valve 22 can be determined.

The present invention is operated in the following manner. When it is desired to set the valve 22 to a closed position, the motor 30 can be simply energized for a sufficient time period to drive the throttling member of the valve to a fully closed position. This position of the valve stem can then be used to set the transducer. Likewise, the valve can be driven to the fully open position and a transducer set to note the fully opened position. It is then possible to control the valve between the fully open and the fully closed positions by measuring the rotary movement of the valve stem, as sensed by the transducer, while the motor is driven in one or the other direction. It would be possible to determine the position of the valve either by the count of the rotations of the stem or by sensing means located downstream of the valve.

One advantage of the present invention over existing rotary actuators is that current devices are limited to a maximum of 360° degrees of rotation, which can limit fine control of a valve. The present invention can also be actuated manually or by sensors in a control loop. It may be desirable in offshore installations to have an automatic shutdown feature that will be controlled by a flow meter which will give a command to the actuator control to shut the well in. The well can then be brought back into production by remote control override when desirable. It is the desired intent that the present invention would be utilized for remotely controlling the valve so that it would not be necessary for production personnel to visit each valve to make an accurate adjustment thereof.

The present invention has a further advantage in that it can be added onto existing valves without requiring either valve replacement or system redesign. This retrofitting of the present invention provides substantial costs savings while allowing substantially immediate upgrading of an existing system. Further, the invention can be installed without requiring system shutdown, except for calibrating the transducer.

The present invention may be subject to many modifications and changes without departing from the spirit or essential characteristics thereof. The present embodiment should therefor be considered in all respects as being illustrative and not restrictive as to the scope of the invention.

We claim:

1. An apparatus for providing remote control of a rotary actuated device, such as a valve, choke or the like, having a throttling member moved within the device by a rotary driven spindle turning greater than 360° to move said throttle member between fully open and fully closed positions, said apparatus comprising:

a frame assembly adapted to be mounted on the device to be controlled;

drive means mounted on said frame assembly aligned to drive the spindle of said device causing said throttling member to move between first and second positions, said drive means having power means, drive train means extending from said power means and operated thereby, and output means extending from said drive train means and connected to said spindle of said device said output means allowing for relative axial movement with said spindle while imparting rotary movement thereto;

transducer means mounted on said frame assembly so as to monitor the rotational movement of said spindle;

means for energizing said drive means in response to a command to actuate said device, energizing means being operatively associated with said transducer means, whereby counting of the rotations of said spindle by said transducer allows said throttling member to be set and reset rapidly and with great accuracy and said drive train means to be degenerated in response to said transducer means indicating that the device has reached a predetermined condition.

* * * * *

UNITED STATES PATENT AND TRADEMARK OFFICE
CERTIFICATE OF CORRECTION

PATENT NO. : 5,156,373

DATED : October 20, 1992

INVENTOR(S) : Jackie R. Boyles, Joseph L. Porter, and Albert P. Richter, Jr.

It is certified that error appears in the above-identified patent and that said Letters Patent is hereby corrected as shown below:

Column 3, line 5 "throttle" should read --throttling--;

Column 4, line 30 "degenerated" should read --deenergized--.

Signed and Sealed this

Twenty-first Day of September, 1993

Attest:

Attesting Officer

BRUCE LEHMAN

Commissioner of Patents and Trademarks